Figure 1:

March 7, 1944.  W. B. CLIFFORD  2,343,402
PROCESS FOR JOINING RADIATOR TUBES AND PRODUCT THEREOF
Filed April 11, 1941

Witness
Charles T. Olson

Inventor
Walter B. Clifford
by his attorneys
Fish Hildreth Cary & Jenney

Patented Mar. 7, 1944

2,343,402

UNITED STATES PATENT OFFICE 2,343,402

PROCESS FOR JOINING RADIATOR TUBES AND PRODUCT THEREOF

Walter B. Clifford, Boston, Mass., assignor to Clifford Manufacturing Co., Boston, Mass., a corporation of Delaware Application April 11, 1941, Serial No. 388,087

4 Claims. (Cl. 113—118)

The present invention is concerned with a method of bonding metallic tubes particularly for radiator work, and more particularly to the formation of articles in which a generally circular tube is expanded and deformed at its ends which abut one another and which are bonded throughout the abutting surfaces.

The invention is concerned with the bonding of tubes, more particularly of aluminum or its alloys, where the bonding material in the nature of a metallic solder has a melting point exceedingly close to the material to be bonded, and in which extremely accurate control of temperature and regulation of the supply of heat are necessary in order to adequately bond all parts of the radiator core without overheating of certain other parts.

Various proposals have been made for this purpose, but it is my intent to provide an adequate supply of soldering material upon the abutting surfaces before soldering and heating in such a manner that the tube ends are thoroughly bonded at their abutting surfaces and without the necessity of supplementary supporting parts or devices during the heating period. Physically in such a construction it is customary to provide a series of tubes of circular cross-section, each provided with an enlarged hexagonal cross-section at its opposite ends which abut one another. The tubes are assembled with the faces of the hexed ends abutting. The assembled hexed ends are then dipped in solder. This method is feasible for copper tubes joined by soft solder, but cannot be used for joining copper tubes with silver solder, nor can it be used for joining aluminum tubes with the only known aluminum soldering material available, since the melting point of the solder is too close to that of the tube material, and the tube ends will be merely liquidated within the solder solution.

I propose to provide a series of rings or thimbles of solder material which may be temporarily assembled with the tube ends before expansion into a hex form, and which will cling to the tube ends at least during the expansion program. These thimbles of soldering material are deformable, but are not, to any great extent at least, expansible, and therefore I provide for the resulting expansion as well as deformation when the circular tube has expanded into a hex form by making the thimbles or rings fluted in cross-section, or by providing a series of radial folds, or some similar structure, so that the thimbles will cling to the circular tube surface when originally formed and when this surface is expanded in perimeter and deformed into hex or other shape, the surrounding thimble will be equally deformed and will completely surround the hexed end of the tube with no expansion, the peripheral length of the thimble in the first instance corresponding to the final desired peripheral length of the tube end when expanded. With this construction, thereafter expanding the tube end and the surrounding thimble into hexed form, a closely fitting ring of soldering material is provided around each expanded tube end. Thereafter assembly of the tube bundle and heating to the required temperature to melt the solder causes the latter to flow and adequately bond the expanded tube ends throughout their abutting surfaces.

Provision may be necessary in any process of this character for causing an equal and uniform heating of all portions of the tube bundle, both about the periphery of the bundle and interiorly thereof. As the material is a good conductor of heat, it is quite likely that attempts to provide some such heating effect in the usual furnace will merely result in an over-heating of the outside tubes in the bundle, with an inadequate heating of the tubes at the interior. This can be overcome by directing the heat interiorly through a special appliance or appliances adapted for this particular purpose.

Figure 2:
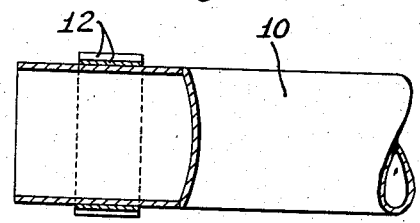
Figure 3:
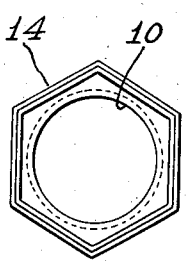
Figure 4:
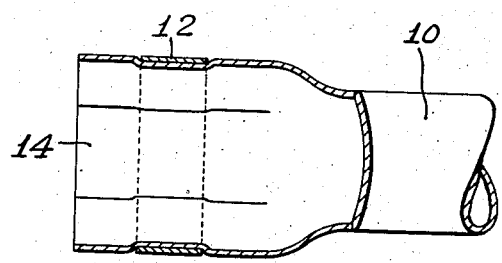

In the illustrated embodiment of the invention, as shown in the drawing, Figs. 1 and 2 represent the tube and surrounding thimble before expansion; Figs. 3 and 4 represent the same product after expansion and deformation into hexagonal form, with the surrounding thimble likewise deformed; and Fig. 5 is a perspective view of a portion of an assembled bundle of tubes.

Referring particularly to the drawing, the tube of circular cross-section may be indicated at 10, is made of aluminum or one of its alloys, and has surrounding its end a thimble 12 of soldering material. This thimble, as indicated, may be preferably fluted as shown, or provided with any similar configuration to permit the thimble to be positioned on the tube with sufficient firmness for the subsequent hexing operation. The thimble is readily deformable without rupture of the material and the perimeter or peripheral length of the thimble corresponds generally to the finally desired length which it is caused to assume.

In Figs. 3 and 4, the tube end has been expanded and deformed into a hexagonal shape as indicated at 14, by hydraulic or mechanical means familiar to those skilled in the art, and the thimble is likewise caused to be deformed into close contact with this end in the manner shown. It will be observed that the thimble is preferably of such peripheral length that its surface is substantially flush with the surface of the hexed end of the tube.

Figure 5:
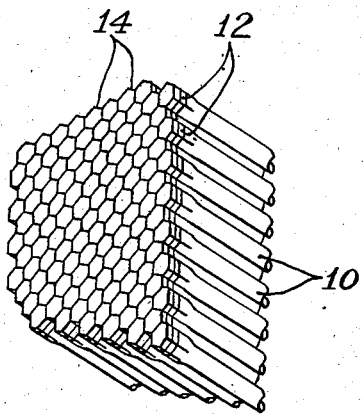

Following the construction as shown in Figs. 3 and 4, a bundle of these tubes of necessary number is assembled with the faces of their hexed ends abutting, as indicated in Fig. 5, and is then subjected to heat to cause the deformed solder thimbles to flow and bond each and every one of the hexed abutting ends of the tubes, making a hermetically sealed and tight joint at the tube ends. Preferably the operation is carried out by brushing or otherwise applying a small amount of flux to each joint, then assembling the tubes, and finally heating the entire assembly in an oven, in which the entire assembly is brought to a temperature above the melting point of the solder by passing currents of heated air through and around the tubes.

In the manufacture of a radiator or heat exchanger core of copper tubes, the thimble 12 is preferably of silver solder. Silver solders generally have a melting point in excess of 1100° F., and the manufacture of cores therewith by the conventional dipping method is practically impossible, because the copper tube ends, although having a normal melting point of 2000° F., are immediately liquified by chemical action when they come into contact with the large mass of molten solder. The difficulty is even greater in the case of aluminum tubes, since the melting points of the only available solder materials are only slightly below the normal melting point of the aluminum.

According to the present invention, the thimbles 12 provide only a sufficient amount of material to bond the hexed tube ends, but without such penetration of the solder into the tube walls as to result in destruction of the tubes.

The term "radiator," as used herein, is a general term applicable to heat exchange apparatus constructed of thin-wall tubes, useful for any purpose, and is applicable to oil coolers, intercoolers, etc.

The invention may be applied to a tube which is originally of cross-section other than circular, the principal feature residing in the expansion of the tube end into a suitable shape while the ring or thimble of solder material is positioned thereon.

What is claimed is:

1. The method of bonding metallic tubes and the like, which consists in forming a thin-wall tube, forming a thimble of soldering material which hugs the tube and which is provided with enlarging flutes to permit enlargement through deformation, and finally deforming the tube end with surrounding ring from a generally circular cross-section in a manner to cause the ring to conform to and hug the tube end.

2. The method of bonding metallic tubes and the like, which consists in forming a relatively thin-wall tube, forming a ring of soldering material with axial enlarging flutes which clings to the tube in formed condition, and subsequently expanding and deforming the tube end with the surrounding ring into the finally desired shape.

3. The method of bonding metallic tubes and the like, which consists in the formation of a tube of aluminum alloy, the formation of a ring of aluminum soldering material with enlarging flutes, assembling the ring with the tube end, deforming and expanding the tube end with the surrounding ring, assembling a bundle of tubes with expanded ends abutting, and raising the tube ends to the melting point of the soldering material to cause the material to spread along the abutting faces of the tube ends.

4. A product for the manufacture of radiators, comprising a thin-wall tube having an expanded hexed end, and a seamless thimble of soldering material surrounding a shallow recessed portion of the hexed end substantially flush with the adjacent surface thereof, said thimble snugly fitting the tube in mechanical contact only.

WALTER B. CLIFFORD.